(12) United States Patent
Cudak et al.

(10) Patent No.: US 9,308,891 B2
(45) Date of Patent: *Apr. 12, 2016

(54) LIMITATIONS ON THE USE OF AN AUTONOMOUS VEHICLE

(71) Applicant: International Business Machines Corporation, Armonk, NY (US)

(72) Inventors: Gary D. Cudak, Creedmoor, NC (US); Christopher J. Hardee, Raleigh, NC (US); Adrian X. Rodriguez, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 147 days.

This patent is subject to a terminal disclaimer.

(21) Appl. No.: 14/181,753

(22) Filed: Feb. 17, 2014

(65) Prior Publication Data

US 2015/0233719 A1    Aug. 20, 2015

Related U.S. Application Data

(63) Continuation of application No. 14/180,422, filed on Feb. 14, 2014, now Pat. No. 9,205,805.

(51) Int. Cl.
*G01C 22/00* (2006.01)
*B60R 25/01* (2013.01)
(Continued)

(52) U.S. Cl.
CPC .............. *B60R 25/01* (2013.01); *B60K 35/00* (2013.01); *B60R 25/102* (2013.01);
(Continued)

(58) Field of Classification Search
CPC .... B60W 50/0098; G06F 19/00; B60R 25/00; B60R 25/01; B60R 25/31; B60R 25/2081; B60R 25/102; G05D 1/0055; B60T 8/4081; B60T 7/042; B60T 13/16; B60T 13/662; B60T 13/58; B60K 37/06; B60Q 1/34
See application file for complete search history.

(56) References Cited

U.S. PATENT DOCUMENTS 7,979,173 B2  7/2011  Breed
8,352,112 B2  1/2013  Mudalige
(Continued)

FOREIGN PATENT DOCUMENTS

JP     02226310 A   9/1990
WO    WO9305492   3/1993

OTHER PUBLICATIONS

"U.S. Appl. No. 14/180,422—Notice of Allowance" Mail date: Jul. 31, 2015, 12 pages.
(Continued)

*Primary Examiner* — Behrang Badii
(74) *Attorney, Agent, or Firm* — Jeffrey L. Streets

(57) ABSTRACT

A method for controlling an autonomous vehicle includes determining whether a primary user is present in an autonomous vehicle, allowing use of a plurality of functions of the autonomous vehicle in response to determining that the primary user is present in the autonomous vehicle, and receiving and storing preferences input by the primary user, wherein the preferences identify a limitation on one or more of the plurality of functions of the autonomous vehicle that should be enforced during use of the autonomous vehicle if the primary user is not present in the autonomous vehicle. The method further includes limiting use of the one or more of the plurality of functions of the autonomous vehicle as specified by the preferences in response to determining that the primary user is not present in the autonomous vehicle.

20 Claims, 4 Drawing Sheets

(51) Int. Cl.
| | |
|---|---|
| *G05D 1/00* | (2006.01) |
| *B60R 25/31* | (2013.01) |
| *B60R 25/20* | (2013.01) |
| *B60R 25/102* | (2013.01) |
| *G01C 21/26* | (2006.01) |
| *B60K 35/00* | (2006.01) |
| *B60R 25/24* | (2013.01) |
| *B60K 37/06* | (2006.01) |
| *B60Q 1/34* | (2006.01) |
| *G06F 19/00* | (2011.01) |
| *G06F 17/00* | (2006.01) |
| *B60W 50/00* | (2006.01) |
| *B60R 25/00* | (2013.01) |

(52) U.S. Cl.
CPC .......... *B60R 25/2081* (2013.01); *B60R 25/241* (2013.01); *B60R 25/31* (2013.01); *G01C 21/26* (2013.01); *G05D 1/0055* (2013.01); *B60K 37/06* (2013.01); *B60Q 1/34* (2013.01); *B60Q 1/343* (2013.01); *B60Q 1/346* (2013.01); *B60R 25/00* (2013.01); *B60W 50/0098* (2013.01); *G06F 17/00* (2013.01); *G06F 19/00* (2013.01)

(56) References Cited

U.S. PATENT DOCUMENTS

| | | | |
|---|---|---|---|
| 8,538,628 | B2 | 9/2013 | Backman |
| 8,751,105 | B2* | 6/2014 | Whelan ................... B60R 25/00 180/268 |
| 2005/0178632 | A1 | 8/2005 | Ross |
| 2008/0262669 | A1 | 10/2008 | Smid et al. |
| 2009/0174540 | A1* | 7/2009 | Smith ...................... B60Q 1/34 340/465 |
| 2010/0168949 | A1 | 7/2010 | Malecki et al. |
| 2012/0072072 | A1* | 3/2012 | Backman ............... B60K 37/06 701/36 |
| 2012/0109423 | A1 | 5/2012 | Pack et al. |
| 2013/0179031 | A1* | 7/2013 | Whelan ............. B60W 50/0098 701/36 |

OTHER PUBLICATIONS

Anonymous Inventors; "Method and process to use driver habits to train autonomous vehicles", Aug. 21, 2013; Database: ip.com; ip.com No. IPCOM000230137D, 3 pages.

Hattori, JP02226310A, "Autonomous Running Vehicle", English Abstract, Sep. 7, 1990, 4 pages.

Anderson, Thomas "Google Wants Autonomous Vehicles on Streets in 3-5 Years" Feb. 11, 2013, http://www.tgdaily.com/general-science-brief/69409-google-wants-autonomous-vehicles-o . . . , Velum Media, 7 pages (pp. 1 and 6 are intentionally blank).

Wikipedia, "Autonomous Car", http://en.wikipedia.org/wiki/Autonomous_car, Sep. 17, 2013; 19 pages.

Tiffany Kaise—Daily Tech "Michigan Could Approve Autonomous Vehicle Licensing as Soon as This Week", http://www.dailytech.com/Michigan+Could+Approve+Autonomous+Vehicle+Licensing, Apr. 17, 2013, 2 pages.

\* cited by examiner

| Preferences (When Primary User is not Present) | | | |
|---|---|---|---|
| Authorized Second User | Prohibited Destinations | Maximum Distance | Other Limitations |
| John Smith | ABC Corp. | 10 miles | M-F, 9am-5pm |
| Kate Marks | − | 25 milers | Internet |
|  |  |  |  |
|  |  |  |  |

Prohibited Items: ☒ Animals  ☒ Smoking  ☐ Beverages  ☐ Food

90

Primary/Secondary User Identification Parameters

| User | Primary/Secondary | Secondary Priority | Mobile ID# | Voice/Facial Recognition File |
|---|---|---|---|---|
| Tom Barnes | Primary | | 123-456-7890 | Voice, Facial |
| John Smith | Secondary | 2 | 246-801-3579 | Voice |
| Kate Marks | Secondary | 1 | 147-036-9258 | Voice, Facial |
| | | | | |
| | | | | |
| | | | | |

LIMITATIONS ON THE USE OF AN AUTONOMOUS VEHICLE

CROSS-REFERENCE TO RELATED APPLICATIONS

This application is a continuation of U.S. patent application Ser. No. 14/180,422 filed on Feb. 14, 2014, which application is incorporated by reference herein.

BACKGROUND

1. Field of the Invention

The present invention relates to the control and operation of an autonomous vehicle.

2. Background of the Related Art

An autonomous vehicle is a vehicle that is capable of navigating roadways without a person controlling the vehicle. The autonomous vehicle may use a variety of sensors, data and processing capacity in order to navigate to a destination, avoid hazards and obey traffic signs. Examples of sensors used by an autonomous vehicle include global positioning system (GPS) receivers, cameras, radar and lidar.

Autonomous cars are now in existence and have logged hundreds of thousands of miles on public roads. Several states, such as Texas and California, have passed laws that allow use of autonomous vehicles. While the basic technology has been largely proven and laws now permit use of such vehicles on public roads, autonomous vehicles are not yet in widespread distribution and use.

BRIEF SUMMARY

One embodiment of the present invention provides a method that comprises determining whether a primary user is present in an autonomous vehicle, allowing use of a plurality of functions of the autonomous vehicle in response to determining that the primary user is present in the autonomous vehicle, and receiving and storing preferences input by the primary user, wherein the preferences identify a limitation on one or more of the plurality of functions of the autonomous vehicle that should be enforced during use of the autonomous vehicle if the primary user is not present in the autonomous vehicle. The method further comprises limiting use of the one or more of the plurality of functions of the autonomous vehicle as specified by the preferences in response to determining that the primary user is not present in the autonomous vehicle.

BRIEF DESCRIPTION OF THE SEVERAL VIEWS OF THE DRAWINGS

FIG. 4 is a diagram of a graphical user interface for entering and storing user priorities and identification parameters for the primary user and all secondary users.

DETAILED DESCRIPTION

Figure 1:
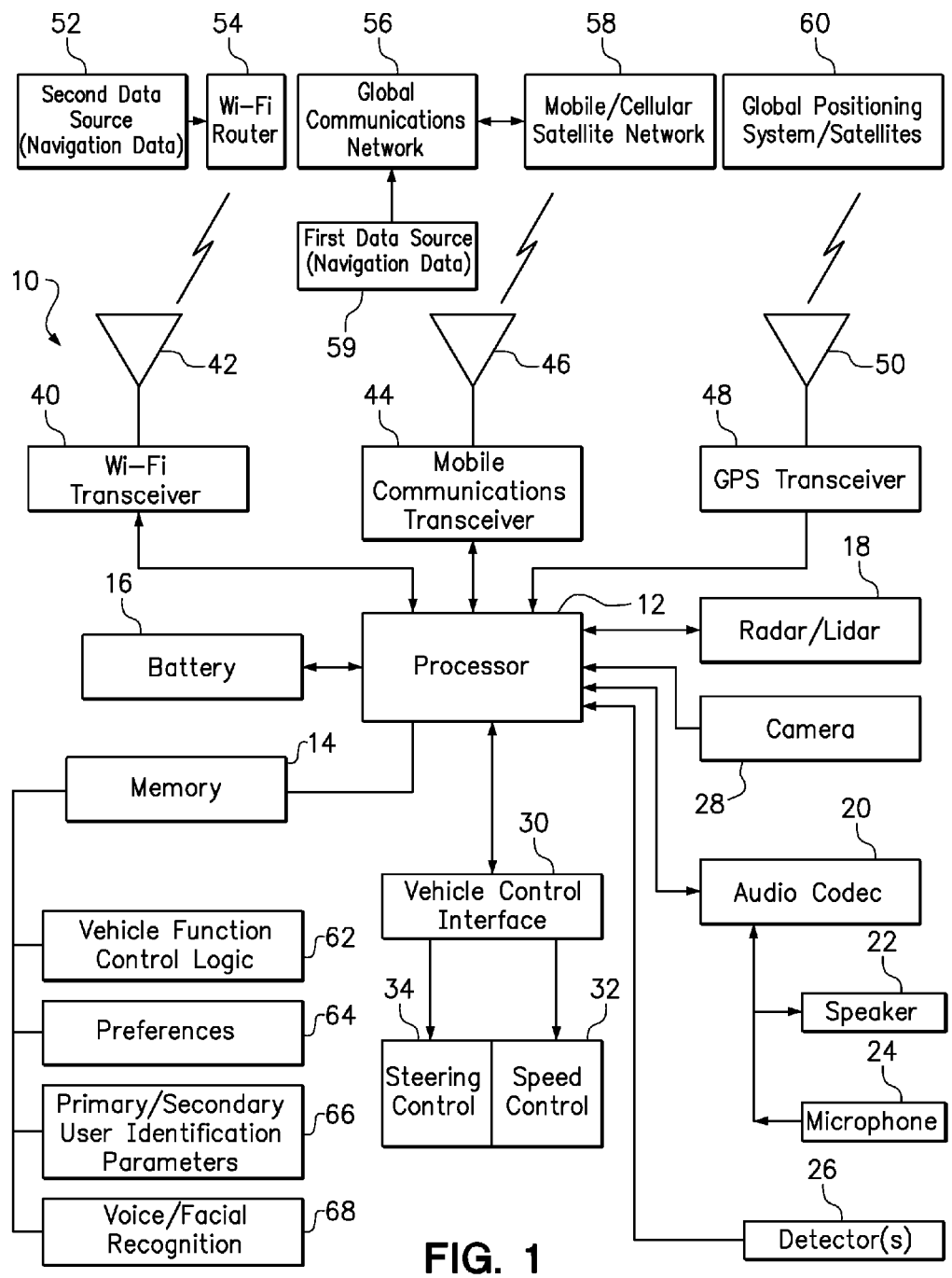
FIG. 1 is a diagram of a computer system controlling an autonomous vehicle.

One embodiment of the present invention provides a method that comprises determining whether a primary user is present in an autonomous vehicle, allowing use of a plurality of functions of the autonomous vehicle in response to determining that the primary user is present in the autonomous vehicle, and receiving and storing preferences input by the primary user, wherein the preferences identify a limitation on one or more of the plurality of functions of the autonomous vehicle that should be enforced during use of the autonomous vehicle if the primary user is not present in the autonomous vehicle. The method further comprises limiting use of the one or more of the plurality of functions of the autonomous vehicle as specified by the preferences in response to determining that the primary user is not present in the autonomous vehicle.

The presence of the primary user in an autonomous vehicle may be determined using various techniques or systems. On example includes detecting sound within the autonomous vehicle, analyzing the detected sound using voice recognition to identify a voice, and comparing one or more voice parameter of the identified voice with one or more previously stored voice parameter associated with the primary user. Another example includes detecting a local wireless transmission from a mobile communication device associated with the primary user. Yet another example includes detection of a radio-frequency identification (RFID) tag that uniquely identifies the primary user, such as an RFID tag attached to, or included within, a wallet, driver's license, key, watch, or other item that would typically be carried with the primary user. Other detection technologies may also be used, such as electronic odor sensors, weight sensors, and facial recognition systems. The technologies mentioned above may be used in various combinations to increase the accuracy and confidence that the primary user has been properly identified as being present.

An autonomous vehicle may perform any of a plurality of functions. Some of these functions may be unique to an autonomous vehicle, such as the interaction between hazard detection and automatic steering control to avoid any detected hazards. Many of the functions are common to vehicles generally, such as speed control, audio and video systems, air conditioning and heating, door locks, window controls, operating modes, and the like.

Preferences or rules are input by the primary user and received and stored in memory accessible to a control system of the autonomous vehicle. The preferences may, among other things, identify a limitation on one or more of the plurality of functions of the autonomous vehicle that should be enforced during use of the autonomous vehicle if the primary user is not present in the autonomous vehicle. For example, the preferences may identify a secondary user and a limitation on the one or more of the plurality of functions of the autonomous vehicle that should be enforced on the secondary user if the primary user is not present in the autonomous vehicle. The method may further comprise determining whether the secondary user is present in the autonomous vehicle, and the step of limiting the use of the one or more of the plurality of functions of the autonomous vehicle as specified by the preferences may include limiting the use of the one or more of the plurality of functions of the autonomous vehicle that should be enforced on the secondary user if the primary user is not present in the autonomous vehicle in response to determining that the secondary user is present in the autonomous vehicle.

Optionally, the manner in which the preferences identify a limitation on the one or more of the plurality of functions of the autonomous vehicle may include affirmatively identifying a subset of the plurality of functions of the autonomous vehicle that may be used by a secondary user if the primary user is not present in the autonomous vehicle. Accordingly, the limitation on a function may be imposed by failing to affirmatively grant or identify that function as being available to a particular secondary user. Specifically, a limitation on one or more of the plurality of functions of the autonomous vehicle may be identified by specifying a subset of the plurality of functions that may be used by secondary users if the primary user is not present in the autonomous vehicle.

The preferences established by the primary user may identify a plurality of secondary users and, for each of the plurality of secondary users, a limitation on one or more of the plurality of functions of the autonomous vehicle that should be enforced on the secondary user if the primary user is not present in the autonomous vehicle. For example, the preferences may identify a limitation on where (i.e., locations or places) the autonomous vehicle may travel if the primary user is not present in the autonomous vehicle. More specifically, the preferences may identify a limitation one or more destinations wherein the autonomous vehicle may not stop if the primary user is not present in the autonomous vehicle. Alternatively, the preference may identify destinations where the autonomous vehicle may stop even if the primary user is not present. Such destinations may include, for example, certain types of destinations (i.e., gas stations), residences or workplaces secondary users (i.e., family, friends and coworkers), emergency destinations (i.e., police stations and hospitals), a defined area (i.e., a city or county), or a range of distance from the owner (i.e., 10 mile radius). Still further, the preferences may limit an amount of energy usage, identify prohibited or blacklisted locations. The preferences may impose a separate set of limitations based upon characteristics of the occupants in the autonomous vehicle, such as the age of one or more individual.

In other non-limiting example, the preferences may prevent a secondary user from performing a function or limit how a secondary user performs a function, where the function is selected from accessing a media file, accessing onboard internet, controlling audio volume, using onboard network access, controlling volume of media performance, traveling above a speed limit or other manners of aggressive driving, taking over manual driving, navigating to a prohibited destination, and navigating along a prohibited route. Such limitations may facilitate ride sharing and other carpooling arrangements without requiring the primary user to always be present.

In a specific example, the method may further comprise the autonomous vehicle transporting the primary user and the secondary user to a first destination without any limitations on use of the plurality of functions of the autonomous vehicle, and the autonomous vehicle transporting the secondary user to a second destination without the primary user present in the autonomous vehicle. This may be the case if the autonomous vehicle is used in a carpool situation where the primary and secondary users are headed to different destinations. However, the method may prevent the autonomous vehicle from transporting the secondary user to a third destination without the primary user present in the autonomous vehicle, wherein the preferences identify that the autonomous vehicle may not stop at the third destination if the primary user is not present in the autonomous vehicle. In this manner, the primary user may implement controls on how the autonomous vehicle is used even after the primary user is no longer in the vehicle. Traditionally, a person driving in a carpool (i.e., a primary user) will drop off the other individuals in the carpool before ending the trip at their own workplace, and then reverse the route at the end of the day. By letting an autonomous vehicle transport the other individuals without the primary user being present, those in the carpool may be dropped off and picked up in a different order that is perhaps more efficient.

The preferences input by the primary user may also identify one or more secondary users as being authorized to use the autonomous vehicle when the primary user is not present in the autonomous vehicle. For example, the preferences may identify a name or other identifier associated with a secondary user. However, the preferences or some other cross-referenced data storage should maintain a record, logically associated with the name or other identifier, which includes parameters that may be used to identify the secondary user. For example, such a record may identify the secondary user's mobile communication device, weight, RFID tag, facial image, voice sample, or password.

An association between two data elements may be a logical association, for example, by storing a logical association between an identifier of a secondary user and detectable parameters for the secondary user. Furthermore, an association might be established by storing the secondary user's identifier (name) in a common record or a list (i.e., a row of a table) along with one or more parameter. As another example, an association might be established by storing the name of the secondary user and the parameters for the secondary user in separate records using a common reference ID (as in a relational database). The logical association between two data elements can be established using any data storage or programming technique.

Optionally, the preferences may identify a plurality of secondary users authorized to use the autonomous vehicle when the primary user is not present in the autonomous vehicle. The preferences may further identify a priority associated with each of the plurality of secondary users. In such an embodiment, when the primary user is not present in the autonomous vehicle, the method may grant control of the autonomous vehicle to a selected secondary user that is present in the autonomous vehicle, wherein the selected secondary user has the highest priority among all of the secondary users present in the autonomous vehicle.

In a further option, the method may further comprise receiving a request from an authorized secondary user for an exception to a limitation, forwarding the request to the primary user and prompting the primary user to approve or deny the exception, receiving a reply message from the primary user approving or denying the exception, and the autonomous vehicle modifying the limitation in response to the reply message indicating approval of the exception and maintaining the limitation in response to the reply message indicating denial of the exception.

In a still further option, the preferences may identify an authorized group of secondary users as being authorized to use the autonomous vehicle when the primary user is not present in the autonomous vehicle. Such an authorized group might be, without limitation, employees of a certain company, members of a civic organization, or participants in a project. Accordingly, the method may further comprise authorizing a secondary user to use the autonomous vehicle in response to determining that the secondary user is a member of the authorized group. Membership in a group may be previously determined and stored in a data file, but may also be determined as needed by searching social media or other data sources.

The preferences may also identify a prohibited item that the primary user does not want to be taken within the autonomous vehicle. Accordingly, the method may limit the use of one or more of the plurality of functions of the autonomous vehicle in response to detecting a prohibited item within the autonomous vehicle. A prohibited item may, for example, be selected from food, alcohol, an animal, or combinations thereof. Any item that is detectable may be prohibited. For example, cigarette smoke may be detected by a smoke detector and used as input to a control system that limits one or more function of the autonomous vehicle.

Conversely, the method may limit use of one or more function of the autonomous vehicle unless a mandatory item is detected within the autonomous vehicle. For example, the mandatory item may be a radio frequency identification (RFID) tag or a wireless transmitter that may be physically secured to or within a device selected from a driver's license, a key, and combinations thereof.

Still further, the method may include receiving and storing an instruction from the primary user, in advance of executing the instruction, instructing the autonomous vehicle to travel from a first location and arrive at a predetermined second location at a predetermined time. Accordingly, the primary user may park the autonomous vehicle and establish a time and place for the autonomous vehicle to pick up the primary user. Alternatively, the primary user may instruct the autonomous vehicle to park itself in an identified parking lot after the primary user exits the vehicle. This embodiment may be used to the advantage that a parking lot may be remote to a user's destination without an inconvenience to the user, such as requiring a long walk from and to the parking lot.

Another embodiment of the present invention provides a computer program product for controlling an autonomous vehicle. The computer program product comprises a computer readable storage medium having program instructions embodied therewith, wherein the program instructions are executable by a processor to cause the processor to perform a method. The method comprises determining whether a primary user is present in an autonomous vehicle, allowing use of a plurality of functions of the autonomous vehicle in response to determining that the primary user is present in the autonomous vehicle, and receiving and storing preferences input by the primary user, wherein the preferences identify a limitation on one or more of the plurality of functions of the autonomous vehicle that should be enforced during use of the autonomous vehicle if the primary user is not present in the autonomous vehicle. The method further comprises limiting the use of the one or more of the plurality of functions of the autonomous vehicle as specified by the preferences in response to determining that the primary user is not present in the autonomous vehicle.

The foregoing computer program products may further include program instructions for implementing or initiating any one or more aspects of the methods described herein. Accordingly, a separate description of the methods will not be duplicated in the context of a computer program product.

FIG. 1 is a diagram of a computer system 10 controlling an autonomous vehicle. The system 10 may include a processor 12, memory 14, a DC power source or battery 16, a Radar or Lidar unit 18, one or more cameras 28, and an audio codec 20 coupled to a speaker 22 and a microphone 24. One or more detectors 26 are included for detecting identification parameters associated with occupants or users within the autonomous vehicle. Such detectors 26 may include a camera providing input for facial recognition, a microphone for providing input for voice recognition, weight sensors for measuring each occupant's weight, or other detectors. The computer system 10 further includes a vehicle control interface 30 which provides signals to a steering controller 32 and a speed controller 34. Other components may also be included.

The system 10 may also include a Wi-Fi transceiver 40 and corresponding antenna 42 allowing the system to communicate with a Wi-Fi router 54, a mobile communications transceiver 44 and corresponding antenna 46 allowing the system to communicate over a mobile/cellular/satellite network 58, and a global positioning system (GPS) transceiver 48 and corresponding antenna 50 allowing the system to obtain signals from a global positioning system or satellites 60. In a non-limiting example, the mobile/cellular/satellite network 58 may be connected to a global communications network 56, such as the Internet. Accordingly, the mobile/cellular/satellite network 58 may include or access a first data source 59, such as a server, for the purpose of obtaining navigation data. Alternatively, navigation data may be obtained from a second data source 55 via the Wi-Fi router 54. As shown, the memory 14 stores vehicle function control logic 62, preferences data 64, primary and secondary user identification parameters 66, and a voice recognition and/or facial recognition module 68.

Figures 2, 3:
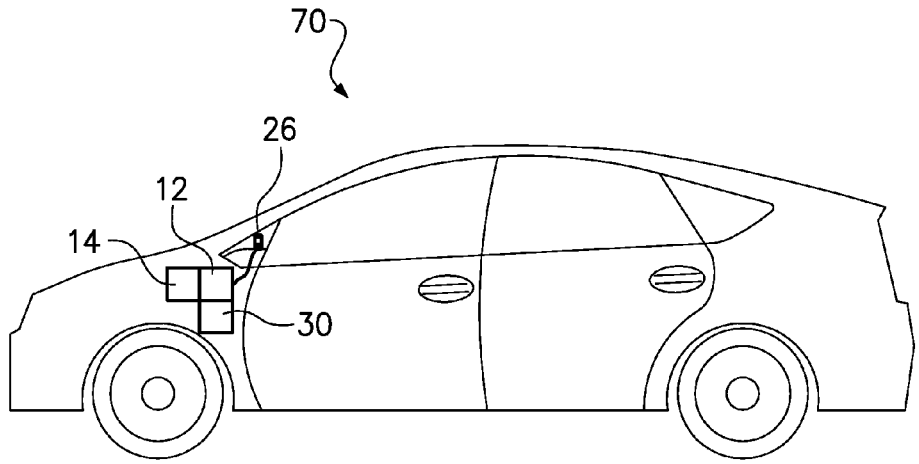
FIG. 2 is a diagram of an autonomous vehicle including the control system of FIG. 1.
FIG. 3 is a diagram of a graphical user interface for entering and storing preferences input by a primary user.

FIG. 2 is a diagram of an autonomous vehicle 70 including the control system of FIG. 1. Only a portion of the control system 10 of FIG. 1 is shown in FIG. 2, but it will be understood that the entire control system may be incorporated into the autonomous vehicle 70. As shown, the vehicle 70 include the processor 12, memory 14 and vehicle control interface 30. The vehicle also includes one or more detectors 26, which are shown as a dash mounted device but may be integrated into one or more components of the vehicle. The one or more detectors 26 may include a camera providing input for facial recognition, a microphone for providing input for voice recognition, weight sensors for measuring each occupant's weight, an electronic nose for detecting odors, or other detectors.

FIG. 3 is a diagram of a graphical user interface 80 for entering and storing preferences input by a primary user. While the autonomous vehicle may store and utilize additional preferences, the preferences shown in the graphical user interface 80 are directed to establishing limitations on how secondary users may use the autonomous vehicle when the primary user is not in the vehicle. Specifically, the graphical user interface 80 includes a table having a first column 81 identifying authorized secondary users by name, a second column 82 identifying any prohibited destinations for each of the secondary users, a third column 83 identifying a maximum distance that may be traveled by the secondary users, and a fourth column 84 that specifies any other limitations on use of the autonomous vehicle, such as time, day of the week, and media access.

A further area 85 of the graphical user interface 80 allows the primary user to select prohibited items from a list of options. As shown, the primary user has checked "Animals" and "Smoking" as prohibited items/activities that should not be in the autonomous vehicle. While the autonomous vehicle may not have means for actually preventing an animal from entering the vehicle or to stopping someone from smoking, the vehicle could prevent the autonomous vehicle from leaving the location where the animal was picked up or send a message to the primary user reporting that someone is smoking in the vehicle.

FIG. 4 is a diagram of a graphical user interface 90 for entering and storing user identification parameters for the primary user and all secondary users. A representative table includes a first column 91 identifying a user name, a second column 92 identifying whether the user is the primary user or a secondary user, and a third column 93 specifying a priority for each of the secondary users. Since the primary user does not have limitations on the functions of the autonomous vehicle that may be used, the primary user is not listed in the first graphical user interface 80 of FIG. 3. Still, the primary user is identified in the second graphical user interface 90 of FIG. 4 for the purpose of determining whether the primary user is present in the autonomous vehicle. The secondary user priority specified in the third column 93 is for determining which one of multiple secondary users can control the autonomous vehicle if the primary user is not present.

A fourth column 94 identifies an identification for a mobile communication device associated with each user, and a fifth column 95 identifies the availability of a voice sample for voice recognition or a facial image for facial recognition. Other types of identifying information may also be used as available. In one example, a mobile communication device being carried with a secondary user will be detected by a short range wireless device, such as a BLUETOOTH device (maintained by the Bluetooth Special Interest Group and standardized in IEEE 802.15.1). Where a facial image is available in memory, an image captured by a camera (i.e., one of the detectors 26 of FIGS. 1-2) may be used to identify occupants of the vehicle. Similarly, where a voice sample is available in memory, sounds captured by a microphone within the vehicle (i.e., one of the detectors 26 of FIGS. 1-2) may be used to identify occupants of the vehicle. Combinations of voice recognition, facial recognition, and other detection methods may be used to increase the accuracy of identifying occupants, such as where an occupant is wearing sunglasses that inhibit facial recognition.

Figure 5:
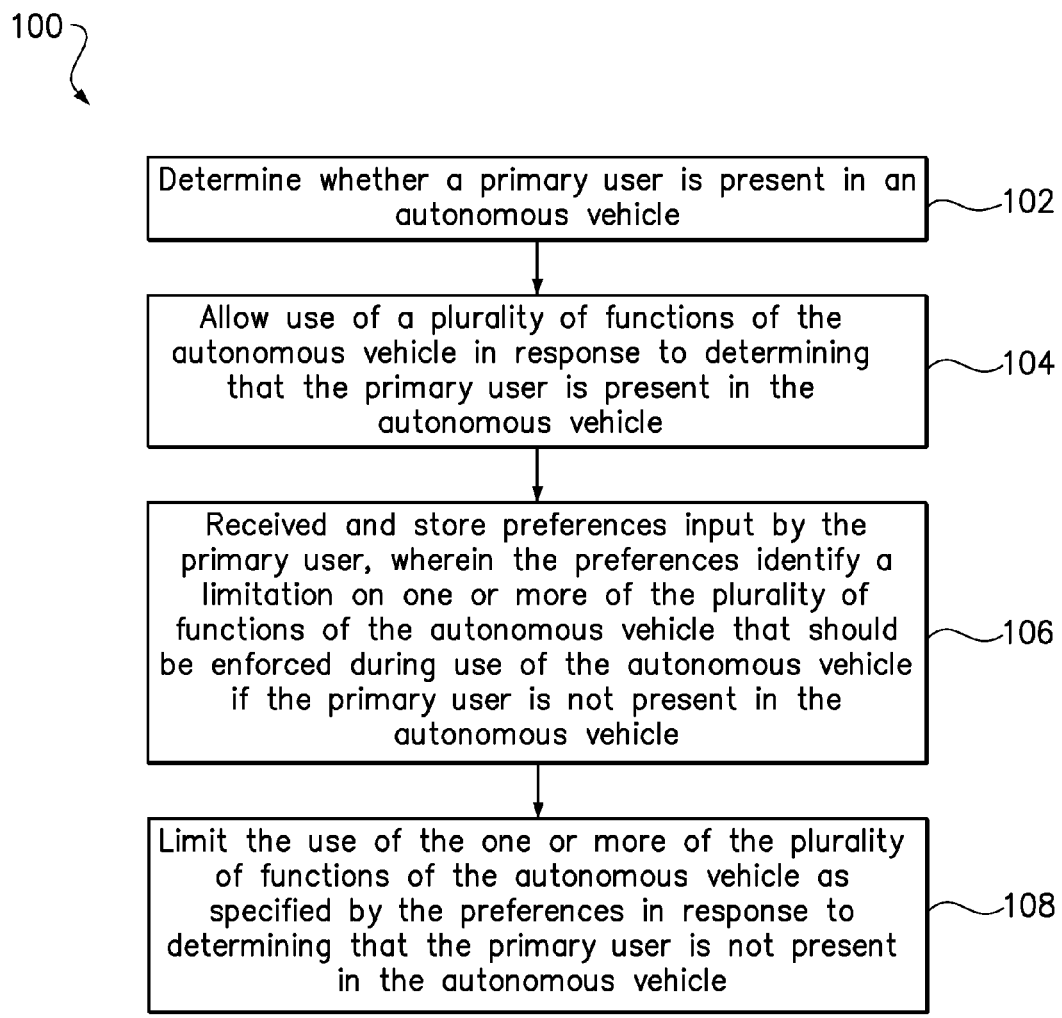
FIG. 5 is a flowchart of a method for controlling an autonomous vehicle in accordance with one embodiment of the present invention.

FIG. 5 is a flowchart of a method 100 for controlling an autonomous vehicle in accordance with one embodiment of the present invention. In step 102, the method determines whether a primary user is present in an autonomous vehicle. In step 104, the method allows use of a plurality of functions of the autonomous vehicle in response to determining that the primary user is present in the autonomous vehicle. Preferences input by the primary user are received and stored in step 106, wherein the preferences identify a limitation on one or more of the plurality of functions of the autonomous vehicle that should be enforced during use of the autonomous vehicle if the primary user is not present in the autonomous vehicle. Step 108 limits the use of the one or more of the plurality of functions of the autonomous vehicle as specified by the preferences in response to determining that the primary user is not present in the autonomous vehicle.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   determining whether a primary user is present in an autonomous vehicle;
   allowing use of a plurality of functions of the autonomous vehicle in response to determining that the primary user is present in the autonomous vehicle;
   receiving and storing preferences input by the primary user, wherein the preferences identify a limitation on one or more of the plurality of functions of the autonomous vehicle that should be enforced during use of the autonomous vehicle if the primary user is not present in the autonomous vehicle; and
   limiting the use of the one or more of the plurality of functions of the autonomous vehicle as specified by the preferences in response to determining that the primary user is not present in the autonomous vehicle.

2. The method of claim 1, wherein the preferences identify a secondary user and a limitation on the one or more of the plurality of functions of the autonomous vehicle that should be enforced on the secondary user if the primary user is not present in the autonomous vehicle.

3. The method of claim 2, further comprising:
   determining whether the secondary user is present in the autonomous vehicle; and
   wherein limiting the use of the one or more of the plurality of functions of the autonomous vehicle as specified by the preferences in response to determining that the primary user is not present in the autonomous vehicle, includes limiting the use of the one or more of the plurality of functions of the autonomous vehicle that should be enforced on the secondary user if the primary user is not present in the autonomous vehicle in response to determining that the secondary user is present in the autonomous vehicle.

4. The method of claim 2, wherein the preferences identify a limitation on the one or more of the plurality of functions of the autonomous vehicle by identifying a subset of the plurality of functions of the autonomous vehicle that may be used by a secondary user if the primary user is not present in the autonomous vehicle.

5. The method of claim 1, wherein the preferences identify a plurality of secondary users and, for each of the plurality of secondary users, a limitation on one or more of the plurality of functions of the autonomous vehicle that should be enforced on the secondary user if the primary user is not present in the autonomous vehicle.

6. The method of claim 1, wherein the preferences identify a limitation on one or more of the plurality of functions of the autonomous vehicle by identifying a subset of the plurality of functions that may be used by secondary users if the primary user is not present in the autonomous vehicle.

7. The method of claim 1, wherein the preferences identify a limitation on where the autonomous vehicle may travel if the primary user is not present in the autonomous vehicle.

8. The method of claim 7, wherein the preferences identify a limitation one or more destinations wherein the autonomous vehicle may not stop if the primary user is not present in the autonomous vehicle.

9. The method of claim 8, further comprising:
   the autonomous vehicle transporting the primary user and the secondary user to a first destination without any limitations on use of the plurality of functions of the autonomous vehicle;
   the autonomous vehicle transporting the secondary user to a second destination without the primary user present in the autonomous vehicle; and
   preventing the autonomous vehicle from transporting the secondary user to a third destination without the primary user present in the autonomous vehicle, wherein the preferences identify that the autonomous vehicle may not stop at the third destination if the primary user is not present in the autonomous vehicle.

10. The method of claim 1, wherein the preferences identify one or more secondary users as being authorized to use the autonomous vehicle when the primary user is not present in the autonomous vehicle.

11. The method of claim 10, wherein the preferences identify a plurality of secondary users authorized to use the autonomous vehicle when the primary user is not present in the autonomous vehicle, and wherein the preferences further identify a priority associated with each of the plurality of secondary users, the method further comprising:
when the primary user is not present in the autonomous vehicle, granting control of the autonomous vehicle to a selected secondary user that is present in the autonomous vehicle, wherein the selected secondary user has the highest priority among all of the secondary users present in the autonomous vehicle.

12. The method of claim 10, further comprising:
receiving a request from an authorized secondary user for an exception to a limitation;
forwarding the request to the primary user and prompting the primary user to approve or deny the exception;
receiving a reply message from the primary user approving or denying the exception; and
the autonomous vehicle modifying the limitation in response to the reply message indicating approval of the exception and maintaining the limitation in response to the reply message indicating denial of the exception.

13. The method of claim 10, wherein the preferences identify an authorized group of secondary users as being authorized to use the autonomous vehicle when the primary user is not present in the autonomous vehicle, the method further comprising:
authorizing a secondary user to use the autonomous vehicle in response to determining that the secondary user is a member of the authorized group.

14. The method of claim 1, wherein the preferences prevent a secondary user from performing a function selected from accessing a media file, using onboard network access, controlling volume of media performance, traveling above a speed limit, navigating to a prohibited destination, and navigating along a prohibited route.

15. The method of claim 1, wherein determining whether the primary user is present in an autonomous vehicle includes detecting sound within the autonomous vehicle, analyzing the detected sound using voice recognition to identify a voice, and comparing one or more voice parameter of the identified voice with one or more previously stored voice parameter associated with the primary user.

16. The method of claim 1, wherein determining whether the primary user is present in an autonomous vehicle includes detecting a local wireless transmission from a mobile communication device associated with the primary user.

17. The method of claim 1, wherein the preferences identify a prohibited item, and wherein limiting the use of the one or more of the plurality of functions of the autonomous vehicle as specified by the preferences in response to determining that the primary user is not present in the autonomous vehicle, includes limiting the use of the one or more of the plurality of functions of the autonomous vehicle in response to detecting a prohibited item within the autonomous vehicle.

18. The method of claim 17, wherein the prohibited item is selected from food, alcohol, an animal, or combinations thereof.

19. The method of claim 1, further comprising:
limiting use of one or more function of the autonomous vehicle unless a mandatory item is detected within the autonomous vehicle, wherein the mandatory item includes a radio frequency identification tag or a wireless transmitter, and wherein the mandatory item is physically secured to or within a device selected from a driver's license, a key, and combinations thereof.

20. The method of claim 1, further comprising:
receiving and storing an instruction from the primary user, in advance of executing the instruction, instructing the autonomous vehicle to travel from a first location and arrive at a predetermined second location at a predetermined time.

* * * * *